D. FULTON.
Plow.
No. 107,676.
Patented Sept. 27, 1870.
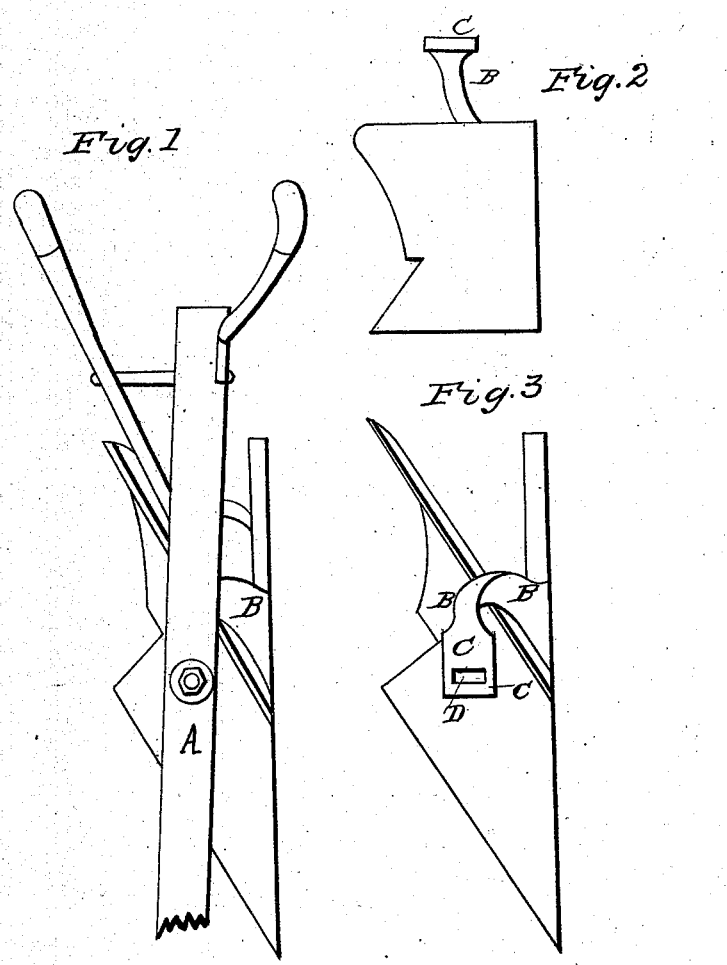

UNITED STATES PATENT OFFICE.

DAVID FULTON, OF ST. HELENA, CALIFORNIA.

IMPROVEMENT IN PLOWS.

Specification forming part of Letters Patent No. 107,676, dated September 27, 1870.

*To all whom it may concern:*

Be it known that I, DAVID FULTON, of St. Helena, county of Napa, and State of California, have invented a certain new and useful Improvement in Plows; and I do hereby declare that the following is a full, clear, and exact description of the same, reference being had to the accompanying drawings and to the letters of reference marked thereon.

My invention relates, principally, to an improved method of attaching the beam to the plow, so that it can be made adjustable and turned from the direction of the line of travel of the point of the plow in such a manner that when cultivating or hilling among or along rows of vines, corn, plants, or shrubs the horse and whiffletree will not come in contact with the overhanging or extended branches or leaves and injure them. This is accomplished by a peculiar bend or curvature of the standard or upright, and placing it nearer the perpendicular center of the mold-board, and providing the upper end of the standard with a slotted plate, on which the beam rests, where it is held in place by a bolt passing through it and the slot.

In the drawings, Figure 1 represents a plan of my plow. Fig. 2 is a front elevation of the same with certain parts removed. Fig. 3 is a plan of parts shown in Fig. 2.

To enable others skilled in the art or science to which it most nearly appertains to make and use my invention, I will proceed to more fully describe its construction and operation.

A represents the beam, which is attached to the handles of the plow in the ordinary manner; but the upright or standard B differs from all others by being bent, inclined, or attached to the plow in such a manner that its upper end will be to the right or away from the land side. The upper end of the standard is provided with a horizontal plate or projection, C, in which I make a transverse slot, D, through which the bolt E, provided with a set-nut, passes for securing the beam.

A great variety of forms may be given to the upright B, and the position of the plate C may be at a greater or less distance from the land or left-hand side of the plow; also, the slot D may have any length required for the purpose of adjusting and setting the beam at any desired angle.

In the plow represented by Fig. 1 the beam is secured rigidly to the handles; but there is sufficient elasticity for all practical purposes without injury to the handles or providing other appliances to admit of moving or setting the beam either to or from land within certain limits.

Ordinarily, in operating with my plow, the beam is set far enough over to enable the horse to walk in the last furrow turned while the plow is making a new one; but in cultivating vines and shrubbery it is frequently desirable to spring the beam still more to the right, in order to avoid the overhanging leaves and branches.

By the use of my improved plow the soil can be cultivated much nearer the hill or row, and in many fields the use of the hoe for hilling will be unnecessary.

Although my invention relates more particularly to one-horse plows, it may be applied successfully to plows where two horses are required.

Having thus described my invention, what I claim, and desire to secure by Letters Patent, is—

The arrangement and relative position of the parts hereinafter named—to wit, the curving standard D, the slotted plate C, the beam, and the mold-board—as shown and described.

In testimony whereof I have hereunto set my hand and seal.

DAVID FULTON. [L. S.]

Witnesses:
C. W. M. SMITH,
H. S. TIBBEY.